United States Patent
Lo et al.

(10) Patent No.: US 10,454,949 B2
(45) Date of Patent: Oct. 22, 2019

(54) GUARDING AGAINST CROSS-SITE REQUEST FORGERY (CSRF) ATTACKS

(71) Applicant: International Business Machines Corporation, Armonk, NY (US)

(72) Inventors: Lewis Lo, Toronto (CA); Ching-Yun Chao, Austin, TX (US); Li Yi, Beijing (CN); Leonardo A. Uzcategui, Georgetown, TX (US); John Yow-Chun Chang, Austin, TX (US); Rohan Gandhi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 14/947,129

(22) Filed: Nov. 20, 2015

(65) Prior Publication Data
US 2017/0149803 A1    May 25, 2017

(51) Int. Cl.
*H04L 9/00*     (2006.01)
*H04L 29/06*    (2006.01)

(52) U.S. Cl.
CPC ........ *H04L 63/1416* (2013.01); *H04L 63/123* (2013.01); *H04L 63/1466* (2013.01); *H04L 63/1483* (2013.01)

(58) Field of Classification Search
CPC .................................................. H04L 63/1416
USPC .......................................................... 723/23
See application file for complete search history.

(56) References Cited

U.S. PATENT DOCUMENTS

| 8,438,649 B2 | 5/2013 | Ichnowski |
| 8,578,461 B2 | 11/2013 | Brown et al. |
| 8,762,731 B2 | 6/2014 | Enger et al. |

(Continued)

FOREIGN PATENT DOCUMENTS

CN      103944900 A     7/2014

OTHER PUBLICATIONS

Barth et al., "Robust Defenses for Cross-Site Request Forgery," CCS'08, ACM, 2008.

(Continued)

*Primary Examiner* — Alexander Lagor
*Assistant Examiner* — Syed M Ahsan
(74) *Attorney, Agent, or Firm* — Michael O'Keefe; Jeffrey S. LaBaw; David H. Judson

(57) ABSTRACT

Cross-Site Request Forgery attacks are mitigated by a CSRF mechanism executing at a computing entity. The CSRF mechanism is operative to analyze information associated with an HTTP request for a resource. The HTTP request typically originates as an HTTP redirect from another computing entity, such as an enterprise Web portal. Depending on the nature of the information associated with the HTTP request, the HTTP request may be rejected because the CSRF mechanism determines that the request is or is likely associated with a CSRF attack. To facilitate this determination, the approach leverages a new type of "referer" attribute, a trustedReferer, which indicates that the request originates from a server that has previously established a trust relationship with the site at which the CSRF mechanism executes. The trustedReferer attribute typically is set by the redirecting entity, and in an HTTP request header field dedicated for that attribute.

14 Claims, 4 Drawing Sheets

(56) References Cited

U.S. PATENT DOCUMENTS

| | | | |
|---|---|---|---|
| 8,856,869 B1 * | 10/2014 | Brinskelle | H04L 63/08 |
| | | | 726/12 |
| 8,914,881 B2 | 12/2014 | Lekies et al. | |
| 2012/0023377 A1 * | 1/2012 | Garskof | G06F 17/30887 |
| | | | 714/48 |
| 2013/0160132 A1 | 6/2013 | Genova et al. | |
| 2014/0317741 A1 | 10/2014 | Be'ery et al. | |

OTHER PUBLICATIONS

Esposito, "Fight Off Forgery Attacks: Use asp.net MVC to Fend Off Intruders," Dr. Dobb's, Apr. 9, 2010.

* cited by examiner

GUARDING AGAINST CROSS-SITE REQUEST FORGERY (CSRF) ATTACKS

BACKGROUND

Technical Field

This disclosure relates generally to web application security.

Background of the Related Art

Ensuring that modern software systems are free of security vulnerabilities is a daunting task. Such systems often comprise large amounts of code, including third party and remote components. Moreover, the measures that need to be taken to prevent potential attacks, in most cases, are far from straightforward, as they depend on the state of the application, the exact content of the (potentially malicious) data being processed, and the use(s) the application is about to make of that data. The problem is aggravated when it comes to web applications, which by design often feed on untrusted data in the form of user input. Also, web applications often make access to security-sensitive resources, such as databases, file systems or sockets. The problem of securing web applications against malicious attacks therefore has received significant attention.

Cross-Site Scripting (XSS), also known as script injection, is a web application vulnerability that allows malicious users to inject code into pages that are viewed by other users. The most severe consequences of XSS issues are that attacker is able to make a legitimate user's browser perform operations that change application state on behalf of that user, or that make a user's browser disclose private data. Typically, cross site scripting attacks attempt to access cookies that the web application uses to implement security features. Cross site scripts, however, also may compromise security in other ways including, without limitation, tricking the user into supplying credentials to the attacker, causing a denial of service type of attack designed to hinder the server (e.g., loops to send emails, loops posting to a forum, or the like), causing a denial of service type of attack designed to hinder the client (e.g., purposefully implementing an infinite client-side processing loop), and delivering security cookies via web application rather than over secure connection.

Another type of malicious website exploit is Cross-Site Request Forgery (CSRF), whereby unauthorized commands are transmitted from a user that the website trusts. CSRF exploits sessions that are maintained for an authenticated user between a web server and a web client. While XSS exploits the trust a user has for a particular site, CSRF exploits the trust that a site has in a user's web client and web browser.

Solutions to guard against CSRF attacks are known but not ideal because the security controls that are implemented to address the exploit typically disrupt normal operations of the site, as well as the web clients that use that site. For example, in one approach, a CSRF filter is used to inject (in an HTTP response) scripts and a verifiable session identifier so that the web client can present the identifier in a subsequent HTTP request; the web server can then use that identifier to validate its trust of a user and his/her web client. A malicious site that exploits the trust (and that may try to trick the user to submit an unauthorized command to the web server) will not have the verifiable identifier. While web browsers typically support this method, other types of web clients (e.g., REST-based, CLI-based) do not because they lack the necessary support, e.g., the ability to propagate the verifiable session identifier. Products that use REST/CLI interfaces have not been upgraded to support this solution given that CSRF is considered only a medium severity vulnerability of its class.

Another method to mitigate CSRF vulnerability is for the server to reject HTTP requests that originate via an intermediate site. Web browsers set an HTTP Referer attribute (in HTTP headers) to indicate access via an intermediate site. While this method could be implemented by a broader set of web clients, the basic notion of just rejecting HTTP requests that have referrer attributes is likely to break web site normal operations. In particular, a common web site user login approach is to leverage HTTP redirect. When the user accesses a web site without security credentials, the web site typically redirects the user's web browser to authenticate first, and then redirect back to the original web resource. During this process, the web browser will set the referrer attribute during HTTP redirect. Likewise, in more advanced web authentication and Single Sign-On (SSO) implementations, the redirect happens across multiple web sites and requires multiple HTTP requests. Thus, simply rejecting all requests that have referrer attributes breaks web client authentication and SSO.

Other approaches attempt to address the CSRF vulnerability by recommending best practices that attempt to reduce the likelihood of attacks. These include reducing session expiration time, minimizing privileges granted to users, or the like.

Still another approach is to require the client to provide authentication data in the same HTTP request used to perform any operation with security implications. Thus, this method attempts to resolve the problem in effect by not using a session. This is not a practical solution, as users rarely perform just a single critical operation. Indeed, disabling the session and requiring the user to authenticate repeatedly for each request simply defeats the purpose of having trust between the web site and the web client.

Yet another method to prevent CSRF is to require a secret, user specific token in all form submissions and side-effect URLs. This method, however, requires the web client to have additional logic and, thus, it has a high implementation cost. One other method to address CSRF is to verify that the HTTP request header contains certain information, or checking the HTTP Referer header and/or HTTP Origin header. These protections, however, have been proven insecure under a combination of browser plug-ins and redirects, which can allow an attacker to provide custom HTTP headers on a request to any website, hence allowing a forged request.

There remains a long-felt need to provide a reliable and cost-effective method to address the CSRF vulnerability.

BRIEF SUMMARY

Cross-Site Request Forgery attacks are mitigated by a CSRF mechanism executing at a computing entity. The CSRF mechanism is operative to analyze information associated with an HTTP request for a resource. The HTTP request typically originates (as an HTTP redirect) from another computing entity, such as the Web portal. Depending on the nature of the information associated with the HTTP request, the HTTP request may be rejected because the CSRF mechanism has determined the request is or is likely associated with a CSRF attack.

Preferably, the CSRF mechanism detects two (2) distinct types of "referer" attributes that may accompany an HTTP request. Typically, the attributes will accompany the HTTP request by being included in an HTTP request header.

During an HTTP redirection from one server to another, the redirecting server may include an HTTP referer attribute that indicates that the request originates from the redirecting server. According to this disclosure, the CSRF mechanism also has the capability to detect another distinct type of attribute, which is referred to herein as a "trusted referer" attribute. The trusted referer attribute is an attribute that indicates that the request originates from a source that is a trusted server. The nature of this trust assurance may vary, but typically it is evidenced by virtue of a trust relationship having been previously established between the redirecting server and the target server. The presence (or absence) of the trusted referer attribute, as well as the conventional HTTP referer attribute, then determines whether the HTTP request will be accepted or rejected.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN
ILLUSTRATIVE EMBODIMENT

Figure 1:
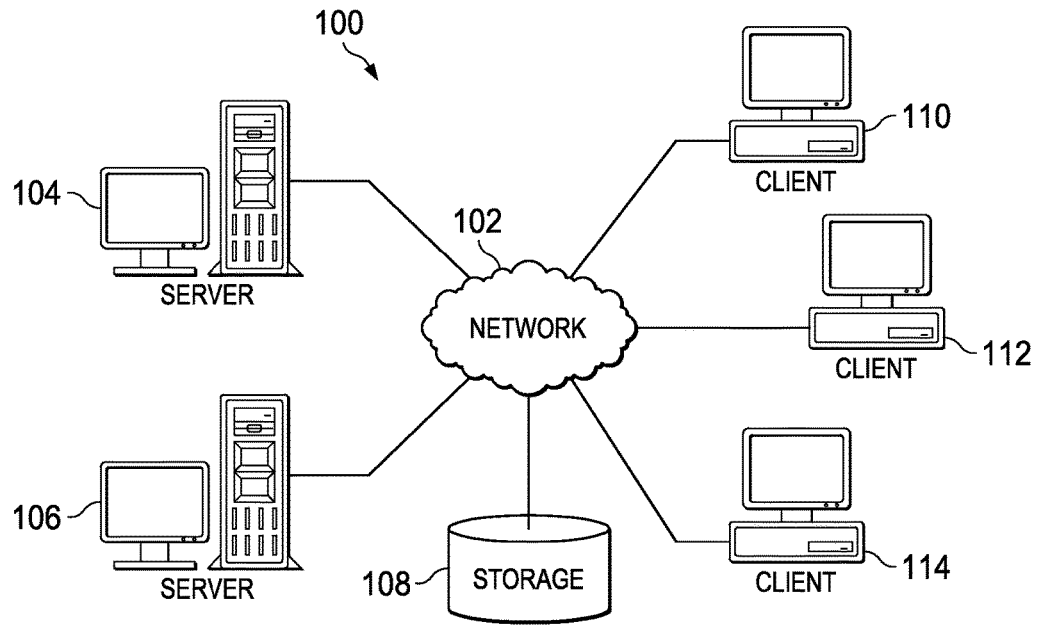
FIG. 1 depicts an exemplary block diagram of a distributed data processing environment in which exemplary aspects of the illustrative embodiments may be implemented.
Figure 2:
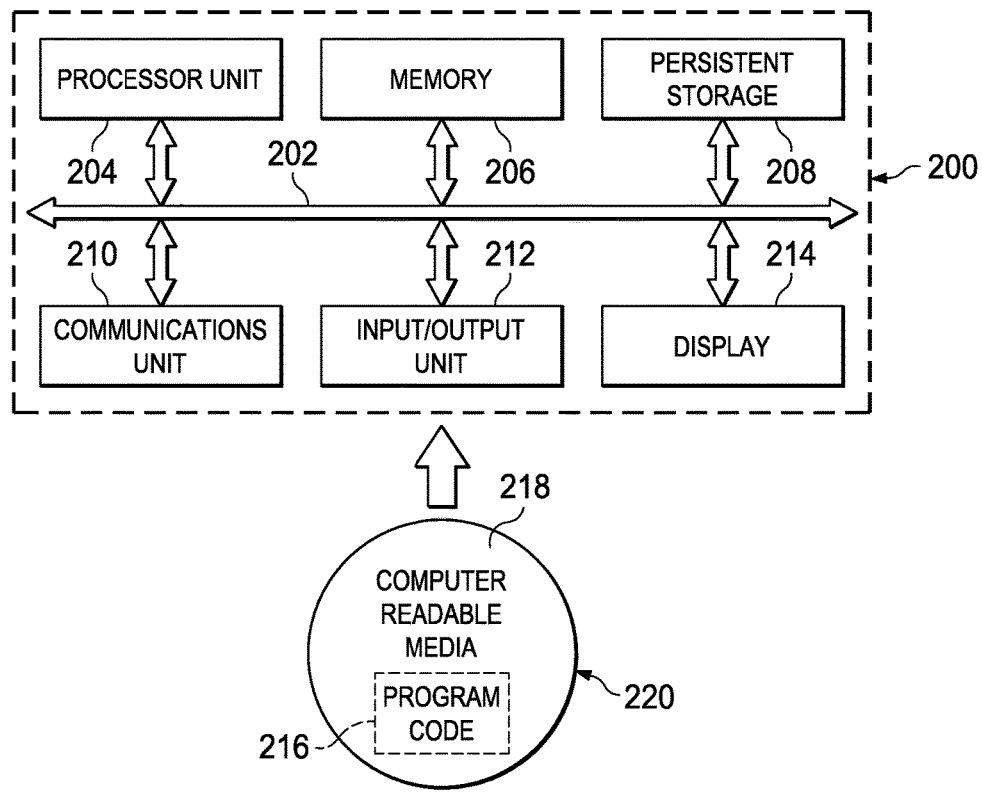
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

Web Proxy/Portal Environments

As will also be described, the technique that is the subject of this disclosure also may be implemented in a system that includes a session management component, sometimes referred to as "Web portal." The following section provides additional details regarding this known system.

Figure 3:
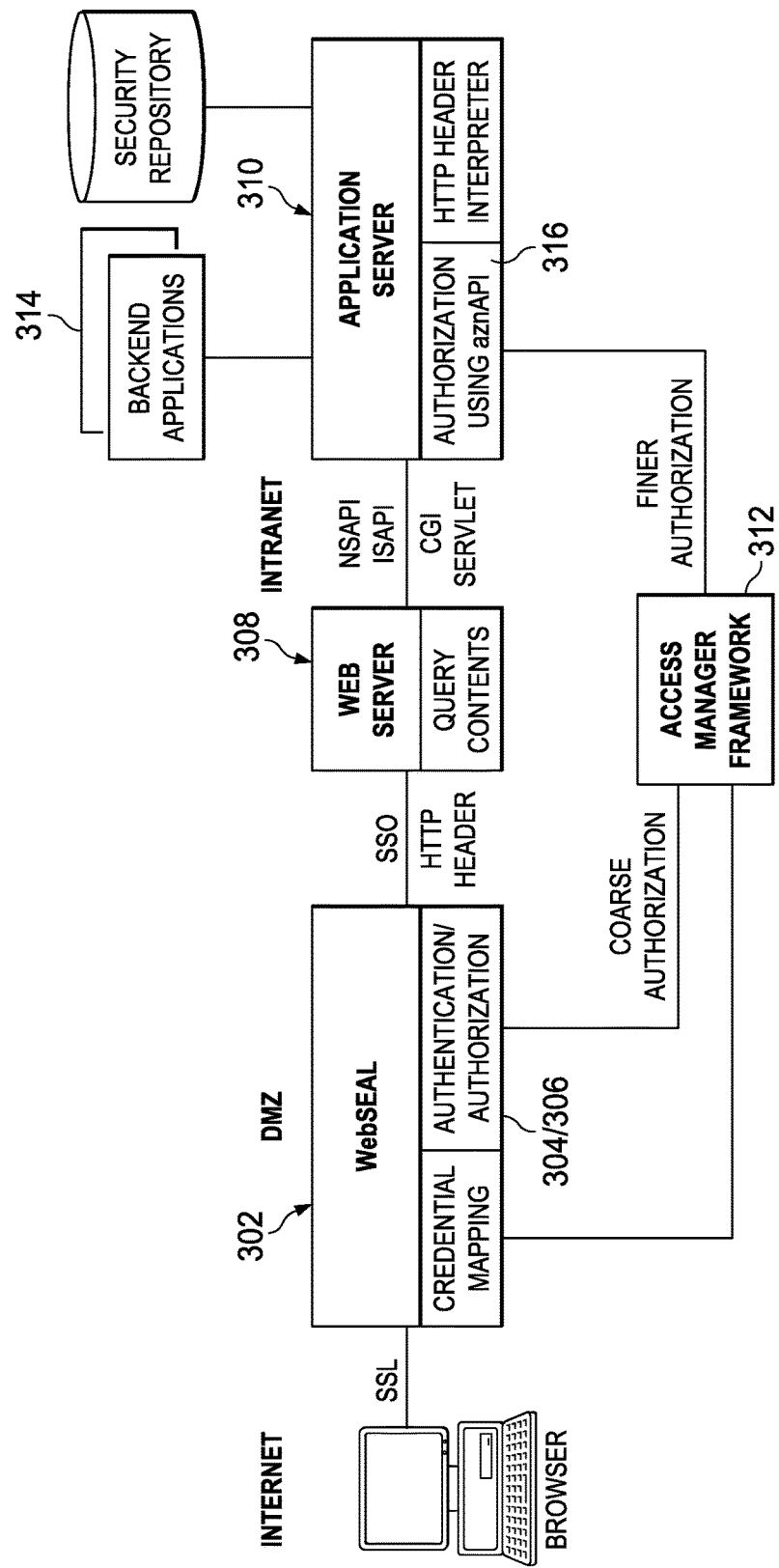
FIG. 3 illustrates a known Web portal having an access management framework in which the subject disclosure may be implemented.

By way of background, session management typically is provided in association with an access manager, which is a component that prevents unauthorized use of resources, including the prevention of use of a given resource in an unauthorized manner. A representative access manager is IBM Security Access Manager (ISAM) (formerly the Tivoli® Access Manager for e-business) product, which is available commercially from IBM, and is represented in FIG. 3. Of course, the identification of this commercial product is not meant to be taken to limit the present invention. More broadly, any system, device, program or process that provides a policy/access/service decision may be used for this purpose. A representative but non-limiting implementation is a point of contact (PoC) that acts as an intermediary between a client browser and one or more back end applications. The point of contact is a reverse proxy, a Web server plug-in, or the like, that is executed in at least one processor. As described above, this component is responsible for the session management of users.

FIG. 3 illustrates how ISAM is integrated in a Web portal to provide authorization and access control services for Web resources. A high performance, multi-threaded Web server 302 (called WebSEAL in the figure), an ISAM component, manages access to all Web servers (such as Web server 308), regardless of their platforms. This allows the enterprise to centrally control their Web resources as a single, logical Web space. When users first enter a portal, they are prompted to provide authentication information that allows the portal to verify the identity of the user. Authentication typically is based around user name and password, although other techniques may be used. An authentication function 304 provides this function. Authorization, in contrast, refers determines what resources an authenticated client can use. For example, a customer may only be able to access e-business applications from the Internet, whereas an employee might also be permitted to access corporate applications. An authorization function 306 provides this function. The Web server component 302 also provides a single sign-on, coarse-grained access control (namely, whether one can access the Web server 308 or not), high availability, and scalability. As shown in FIG. 3, the access manager also enables access control for individual objects on the Web server 308 or application server 310. This may be accomplished by placing a custom common gateway interface (CGI) script on the Web server. This script allows a management console to display and manage the Web space, or application space, of the Web and application servers. Preferably, the access manager framework 312 handles access control for static content and dynamic content. In particular, a utility may be used to place access control lists (ACLs) in components of applications, or in CGIs. By passing user and group information in HTTP headers, the application server 310 can make further access control decisions if required. The information passed from WebSEAL can also be used to access back end applications 314. In addition, for more fine-level authorization control, the access manager implements aznAPI 316, which as noted above allows an application to call out to an authorization service for authorization decisions. In this case, access manager identity information passed to the application server by an HTTP header can be used by aznAPI to make further fine-grained access control decisions, e.g., based on the specific internals of the application (and any authorization decisions enforced by the WebSEAL component 302). Information passed from WebSEAL and obtained from the access manager framework 312 can be used to make access decisions to back end applications.

As one of ordinary skill in the art will appreciate, ISAM provides a reverse proxy, web plug-in or the like that provides session management functionality and that includes authorization functionality as part of this session management. Authentication is handled by ISAM, meaning that ISAM collects a user's authentication credentials, evaluates them, and establishes a session, including some form of session management functionality (such as a session cookie). To provide a user with the advantages of this consolidated environment, ISAM then provides a single sign-on solution for the user by asserting authentication credentials (such as username/password) to the back-end applications. This allows the back-end application to be added to the portal environment without modification.

Establishing Trust Relationships Across Servers

By way of additional background, and as will be described, the technique of this disclosure may be carried out by servers operating within a trust framework, e.g., wherein a first web server and a second web server have setup a trust relationship. One of the servers may be Web portal, as has been described.

Figure 4:
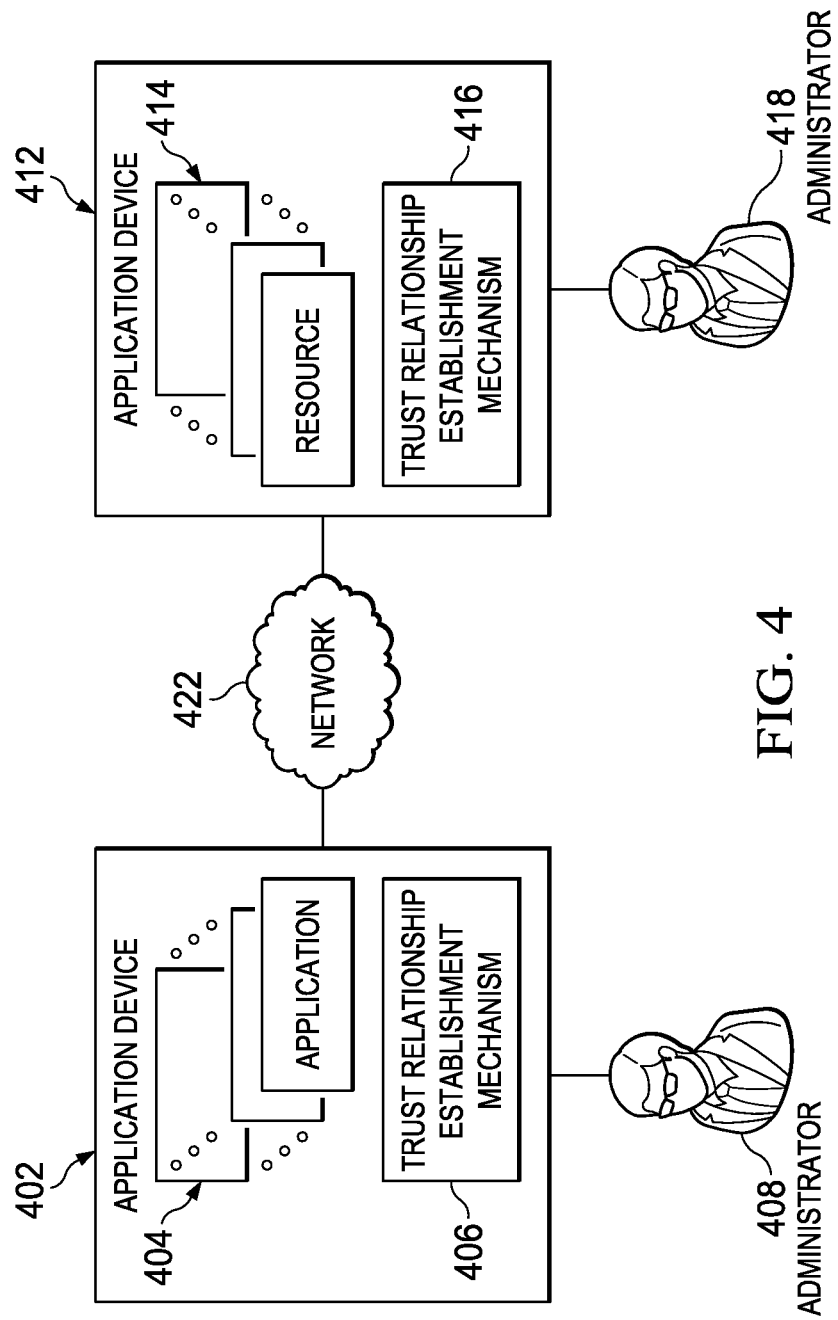
FIG. 4 illustrates a known technique to establish a trust relationship between a pair of servers, one of which may be operating the Web portal shown in FIG. 3.

FIG. 4 depicts a functional block diagram of trust relationship establishment mechanism in accordance with a known approach. Data processing system 400 comprises device 402 and device 412, which are computing devices in communication with each other over network 422. Device 402 comprises a set of applications 404 of which users of one or more applications of the set of applications 404 need to access one or more resources in a set of resources 414 comprised within device 412. In order that one or more applications in device 402 may access one or more resources in device 412, trust relationship establishment mechanism 406 in conjunction with trust relationship establishment mechanism 416 provide for establishing a trust relationship between the one or more applications and the one or more resources.

To establish the trust relationship, administrator 408 of device 402 initiates a registration request to register the one or more applications with the one or more resources, e.g., via a user interface (UI) to trust relationship establishment mechanism 406. Administrator 408 may include in the registration request one or more registration artifacts, such as a redirection uniform resource identifier (URI), a requested scope that identifies a role of the requesting one or more applications, a local state of device 402, an identifier representing the administrator 408, a public key or certificate for the one or more applications, any additional authentication data associated with the application or the user of the application, the one or more resources to be accessed, or the like. Administrator 408 may then submit the registration request and, by sending the registration request via trust relationship establishment mechanism 406, trust relationship establishment mechanism 406 may send the registration request to trust relationship establishment mechanism 416 as an authorized registration request. Trust relationship establishment mechanism 406 may send additional credential data in the registration request to trust relationship establishment mechanism 416 to enable trust relationship establishment mechanism 416 to validate authenticity of subsequent request in a next trust establishment operation.

Upon trust relationship establishment mechanism 416 receiving the registration request from trust relationship establishment mechanism 406, trust relationship establishment mechanism 416 validates that the registration request is a valid registration request from an associated trust relationship establishment mechanism. If the registration request is validated, then trust relationship establishment mechanism 416 imports the one or more registrations artifacts associated with the authorized registration request and presents the registration request to administrator 418 via a user interface (UI). Upon administrator 418 approving/granting access of the one or more applications to the one or more resources sends a registration response back to trust relationship establishment mechanism 406 via trust relationship establishment mechanism 416 using the redirection URI provided by the trust relationship establishment mechanism 406. The registration response includes an authorization code and any local state provided by trust relationship establishment mechanism 406. The authorization code may be encrypted by a symmetric key. The symmetric key being a one-time use key that is generated per request and has an expiration time period.

Upon trust relationship establishment mechanism 406 receiving the registration response from trust relationship establishment mechanism 416, trust relationship establishment mechanism 406 generates an access token request to be sent to trust relationship establishment mechanism 406. The access token request includes the redirection URI, verifiable authentication data, as well as the symmetric key. Trust relationship establishment mechanism 406 then submits the access token request using the authorization code previously received from trust relationship establishment mechanism 416 and sends the access token request to trust relationship establishment mechanism 416. Further, by sending the access token request via trust relationship establishment mechanism 406, trust relationship establishment mechanism 406 may send the access token request to trust relationship establishment mechanism 416 as an authorized access token request. Trust relationship establishment mechanism 406 may use credential data sent to the trust relationship establishment mechanism 416 in a previous operation to create verifiable authentication data in the access token request.

Upon trust relationship establishment mechanism 416 receiving the access token request from trust relationship establishment mechanism 406, trust relationship establishment mechanism 416 validates that the access token request is an authorized registration request from an associated trust relationship establishment mechanism by verifying the authorization code. If the access token request is validated, then trust relationship establishment mechanism 416 verifies that the redirection URI included with the access token request matches the redirection URI provided with the registration request. If trust relationship establishment mechanism 416 verifies that the redirection URI included with the access token request is the same as the redirection URI provided with the registration request, the trust relationship establishment mechanism 416 sends an access token back to trust relationship establishment mechanism 406 via trust relationship establishment mechanism 416. The access token does not have an expiration time period and is signed with a token issuer public key. A finite expiration time and a renewal token may be used to renew the access token in another embodiment. The access token may be used by resource-side system to grant application side devices and users authorized access to resource side resources.

Other types of trust frameworks may be used as well, e.g., using OAuth 2.0-based protocols, and the like.

Generalizing, the trust framework enables two (or more) independent products or services (e.g., executing on different computing systems) to establish a trust relationship between them so that users of one product are authorized to use resources provided by the other product. The framework typically leverages one or more security services (e.g., user authentication, token service, and a certificate authority), as well as public key technology to secure communications. In addition, the integrity and confidentiality of requests and responses during the trust establishment process typically are protected by transport layer encryption, such as SSL.

Guarding Against CSRF Attack

With the above as background, the subject matter of this disclosure is now described. According to this disclosure, Cross-Site Request Forgery attacks are mitigated by a CSRF mechanism executing at a computing entity. The CSRF mechanism is operative to analyze information associated with an HTTP request for a resource that is available from the computing entity. Typically, the resource is a protected resource, namely, a resource to which access is restricted in some manner. The HTTP request typically originates (as an HTTP redirect) from another computing entity, such as the Web portal shown in FIG. 3, although this is not a limitation. Depending on the nature of the information associated with the HTTP request, and as will be seen, the HTTP request may be rejected because the CSRF mechanism has determined the request is or is likely associated with a CSRF attack. Because in this circumstance the HTTP request is rejected by the computing entity running the CSRF mechanism, the attack fails.

The CSRF mechanism typically is implemented in software, e.g., as a set of computer program instructions, executing in one or more hardware processors. The mechanism may execute as a plug-in to other code (e.g., a web server, an application server, or the like) executing in the computing entity, or it may execute as native code. More generally, the CSRF mechanism may be implemented as any type of device, module, program, process, thread, script, or the like. In another implementation, the CSRF mechanism may itself operate as a remotely accessible service, e.g., a web service.

Preferably, the CSRF mechanism detects two (2) distinct types of "referer" attributes that may accompany an HTTP request. Typically, the attributes will accompany the HTTP request by being included in the HTTP request header. As described above, during an HTTP redirection from one server to another, the redirecting server may include an HTTP referer attribute that indicates that the request originates from the redirecting server. According to this disclosure, the CSRF mechanism also has the capability to detect another distinct type of attribute, which is referred to herein as a "trusted referer" attribute. The trusted referer attribute is an attribute that indicates that the request originates from a source that is a trusted server. The nature of this trust assurance may vary, but typically it is evidenced by virtue of a trust relationship (such as described above with respect to FIG. 4) having been established between the redirecting server and the target server. The trusted referer attribute also may be added by the redirecting server when that server is otherwise trusted to provide identity management and authentication services.

Thus, and according to this disclosure, if a redirecting (or, more generally, intermediary) server can establish that it is trustworthy, it sets an identifier in the trusted referer attribute field of the HTTP request. This identifier is adapted to be verified by the CSRF mechanism and thus is sometimes described herein as a "verifiable identifier." The structure of the identifier may vary, but typically it is a data string that includes the hostname of a domain associated with the trusted server. Preferably, the trusted referer attribute field is an HTTP request header field that is designated for this purpose (namely, to carry this data), although this is not a requirement, as an alternative approach is to use some exisiting HTTP request header field (e.g., by an override) to include the identifier. As noted, the identifier preferably is a data string that, upon verification, confirms that the redirecting server is indeed a trusted server.

Thus, in addition to the usual HTTP referer attribute (commonly known as "HTTP Referer"), which does not provide any information regarding "trust," the protocol described herein uses an additional referer attribute, the trusted referer attribute (sometimes referred to as "trustedReferer") to provide the "trust" information. As noted, the trust information evidenced by the trustedReferer attribute is that the computing entity providing the attribute has an established trust relationship established. Typically, these attributes are distinct and separate from one another. In an alternative embodiment, the two referer attributes are combined together (e.g., by concatenation, or by some reversible function), in which case the CSRF mechanism has the capability to decode the received information into the separate referer attribute components.

In addition, and depending on the existence and nature of the trust relationship and how the user is authenticated (to the redirecting server), the HTTP request also may have associated therewith a user token that can be verified by the receiving server; in the alternative, the HTTP request may itself be authentication request.

Figure 5:
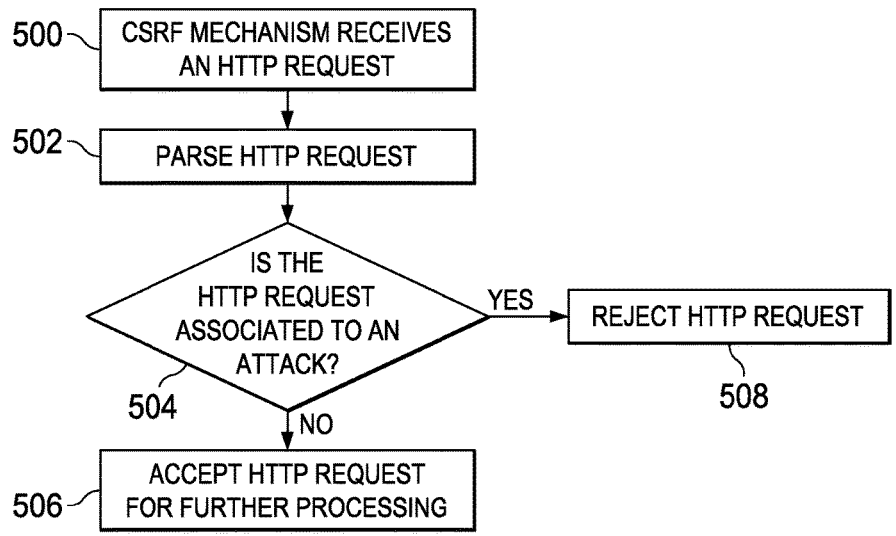
FIG. 5 depicts a process flow of the basic technique of this disclosure.

In operation, and as shown in FIG. 5, at step 500 the CSRF mechanism receives an HTTP request (e.g., an HTTP redirect request) that includes the referer attribute data, e.g., in an HTTP request header. Generalizing, the request header may or may not have at least the following attributes: {Referer [value]| trustedReferer [identifier]}, as previously described. The CSRF mechanism then parses the HTTP request. This is step 502. Using the information in the HTTP request and, in particular, the trustedReferer if and when it is present, the CSRF mechanism then performs a test at step 504 to determine whether the received HTTP request is associated with a CSRF attack. If not (i.e., the outcome of the test at step 504 is negative), the request is passed for handling. This is step 506. If, however, the CSRF mechanism determines that the request is associated with a CSRF attack, the request is rejected. This is step 508, and it completes the process.

Preferably, the determining step 504 accepts the HTTP request if and only if the following conditions are met with respect to the received HTTP request: (i) there are no referrer attributes (of either type) associated with the request; or (ii) there is a trustedReferer attribute that can be verified by the target server, and further that the HTTP request either is an authentication request or otherwise contains one or more verifiable users tokens from trusted partner web sites (that need to be exchanged to a user token at the target web site); or (iii) there are both referrer attributes and trustedReferer attributes, and the HTTP request already has associated therewith one or more target web site user security tokens. The target site will reject the HTTP request if there are referer attribute(s) but no trustedReferer attribute(s).

Figure 6:
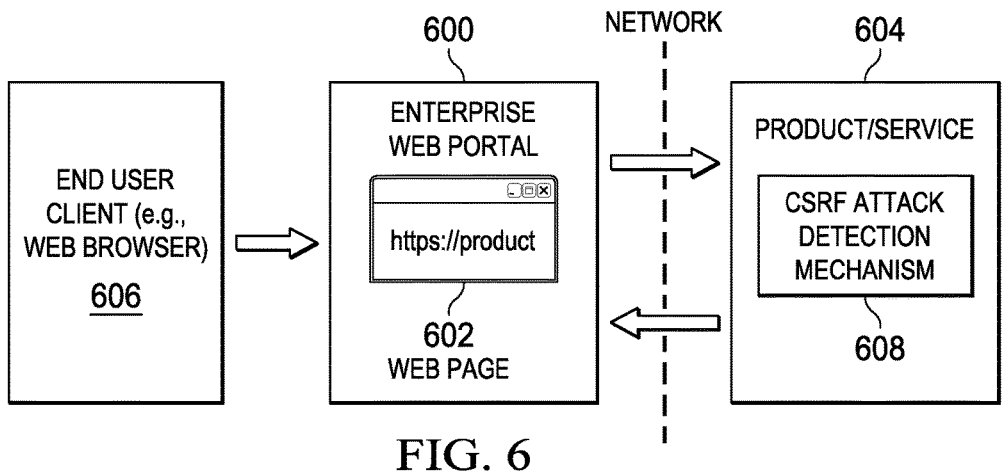
FIG. 6 depicts a representative use case for the technique of this disclosure.

FIG. 6 depicts one possible use scenario, although the technique of this disclosure is not intended to be limited to this scenario. In this example, an enterprise (such as a corporation) sets up an internal portal site 600 that contains a page having a product URL link 602 to a product 604 that its employees may use. The product is the target server (or web site), and typically the product is located in a domain that is not controlled by the enterprise. Thus, e.g., the product may be cloud-based. An end user client 606 is associated with an authorized user, e.g., a corporate employee. One or more security mechanisms (e.g., authentication using SSO, authorization via a policy manager, etc.) typically are in place. In the context of this disclosure, this means that the corporate portal 600 has an established trust relationship with the product 604, as evidenced by a trust association token. The product 604 at the target site executes the CSRF mechanism 608 as previously described. Following establishment of the trust relationship between the portal 600 and the product 604, when the portal refers the user client 606 to the product (e.g., by virtue of a user selecting the link 602), the portal injects the trustedReferer attribute into the HTTP redirect. The user may or may not have been already authenticated to the product 604. Thus, for example, assume the user has previously authenticated to the product as A, and then authenticates to the corporate portal as B. When the user then selects the link and the portal refers the user to the product, the user will follow the SSO process and establish a new session with the product as B assuming the CSRF check passes. The new session of B replaces the previous session of A (on the product) so that no other security concerns are raised.

The technique described herein has numerous advantages. As described above, CSRF exploits the trust web sites have on their web clients. Attacks exploit the session maintained between web site and their web clients and trick web client to perform actions not authorized by them on the web site. From web site perspective, some HTTP requests from authenticated users can be trusted, and some HTTP requests from authenticated users should not be trusted. The technique described herein provides a mechanism to enable the web site to effectively and efficiently decide what HTTP requests from authenticated users can be trusted, while not requiring the web client to write or run any code and scripts. The approach can be supported in web sites irrespective of their real-life complexity. The approach not only deals with a simple one-to-one trust relationship between a web client and a web site, but also a one-to-many web of trust among the web client and multiple web sites.

The block diagrams in the different depicted embodiments illustrate the architecture, functionality and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The technique as described preferably leverages the existence of a verifiable trust relationship that is established between a referring server, and the server that is running the CSRF mechanism. As noted above, the particular trust establishment process used may vary. The verifiable identifier injected in the request (in the form of the trustedReferer attribute) thus leverages the trust relationship previously established between web sites, and hence they can validate if the requests are indeed redirected from the specified web site partners.

In an alternative embodiment, cryptographic techniques may be used to build the trustedReferer attribute data using verifiable secrets, but other methods can be used as well.

The trustedReferer attribute typically is a distinct, stand-alone value but, as noted above, it may be combined with other information, e.g., the Referer attribute, the user token value, some other trust association token, or the like.

The technique herein may be used with other requests other than HTTP requests, e.g., HTTPS, FTP, FTPS, and the like.

The trustedReferer attribute may be provided to the target server (running the CSRF mechanism) out-of-band with respect to the HTTP request.

The "trustedReferer" nomenclature is not intended to be limiting.

Although the trustedReferer attribute typically will be indicative of a previously-established trust relationship, that relationship may also be one that is setup dynamically or at the time of the access request.

The trustedReferer attribute typically is set in an HTTP redirect, but this is not a requirement either, as previously described.

The disclosed subject matter can take the form of an entirely hardware embodiment, an entirely software embodiment or an embodiment containing both hardware and software elements. In a preferred embodiment, the invention is implemented in software, which includes but is not limited to firmware, resident software, microcode, etc.

The disclosed subject matter can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium is tangible, and it can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk--read only memory (CD-ROM), compact disk-read/write (CD-R/W) and DVD.

In one embodiment, the program instructions are stored in a computer readable storage medium in a data processing system, and these instructions are downloaded over a network from a remote data processing system. In an alternative embodiment, the instructions are stored in a computer readable storage medium in a server data processing system, and the instructions are downloaded over a network to a remote data processing system for use in a computer readable storage medium with the remote system.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As described above, a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The description of the disclosed subject matter has been presented for purposes of illustration and description, and is not intended to be exhaustive or limited to the invention in the form disclosed. Many modifications and variations will be apparent to those of ordinary skill in the art. The embodiment was chosen and described to best explain the principles of the invention, the practical application, and to enable others of ordinary skill in the art to understand the invention for various embodiments with various modifications as are suited to the particular use contemplated.

As noted, the techniques described herein may be implemented in or in conjunction with various server-side architectures including simple n-tier architectures, web portals, federated systems, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

Finally, while given components of the system have been described separately, one of ordinary skill will appreciate that some of the functions may be combined or shared in given instructions, program sequences, code portions, and the like.

The techniques herein provide for improvements to another technology or technical field, namely, web portal and other network-based access control systems, as well as improvements to the functioning of web-based security systems.

Having described our invention, what we now claim is as follows.

The invention claimed is:

1. A method to guard against Cross-Site Request Forgery (CSRF) attacks, operative at a first service, comprising:
   upon receipt of a request redirected to the first service from a second service in an HTTP redirect, evaluating an HTTP request header field of the request to determine whether the second service has set a particular attribute in the HTTP request header field, the HTTP request header field being a request header field designated for the particular attribute, the particular attribute being dedicated to indicating a trust relationship as having been established between the first service and the second service prior to the HTTP request, the particular attribute being distinct from a referer attribute that is indicative of the request having been referred to the first service from the second service;

performing a validation assessment to determine whether the request is associated with a CSRF attack, the validation assessment being based at least in part on information associated with the particular attribute; and based on the validation assessment, accepting the request for further processing, or rejecting the request.

2. The method as described in claim 1 wherein the validation assessment includes verifying that the particular attribute is an identifier that can be verified as indicating the trust relationship between the first service and the second service.

3. The method as described in claim 1 wherein the request is accepted when a condition is met, the condition being one of: (i) no referer attributes including the particular attribute are associated with the request; (ii) the particular attribute is present and can be verified as indicating the trust relationship; and (iii) the particular attribute is present together with a referer attribute, and the request can be verified to be associated with a given security token.

4. The method as described in claim 1 wherein the second service is a web portal and the first service is associated with a computing domain that is distinct from the web portal.

5. The method as described in claim 1 wherein the request is an HTTP request and the particular attribute is set by the first service in association with the HTTP redirect.

6. An apparatus operative at a first service, comprising:
a processor;
a computer memory holding computer program instructions executed by the processor to guard against Cross-Site Request Forgery (CSRF) attacks, the computer program instructions configured:
upon receipt of a request redirected to the first service from a second service in an HTTP redirect, to evaluate an HTTP request header field of the request to determine whether the second service has set a particular attribute in the HTTP request header field, the HTTP request header field being a request header field designated for the particular attribute, the particular attribute being dedicated to indicating a trust relationship as having been established between the first service and the second service prior to the HTTP request, the particular attribute being distinct from a referer attribute that is indicative of the request having been referred to the first service from the second service;
to perform a validation assessment to determine whether the request is associated with a CSRF attack, the validation assessment being based at least in part on information associated with the particular attribute; and
based on the validation assessment, accepting the request for further processing, or rejecting the request.

7. The apparatus as described in claim 6 wherein the validation assessment includes verifying that the particular attribute is an identifier that can be verified as indicating the trust relationship between the first service and the second service.

8. The apparatus as described in claim 6 wherein the request is accepted when a condition is met, the condition being one of: (i) no referer attributes including the particular attribute are associated with the request; (ii) the particular attribute is present and can be verified as indicating the trust relationship; and (iii) the particular attribute is present together with a referer attribute, and the request can be verified to be associated with a given security token.

9. The apparatus as described in claim 6 wherein the second service is a web portal and the first service is associated with a computing domain that is distinct from the web portal.

10. The apparatus as described in claim 6 wherein the request is an HTTP request and the particular attribute is set by the first service in association with the HTTP redirect.

11. A computer program product in a non-transitory computer readable medium for use in a data processing system, the computer program product holding computer program instructions which, when executed by the data processing system operative at a first service, guard against Cross-Site Request Forgery (CSRF) attacks, the computer program instructions operative:
upon receipt of a request redirected to the first service from a second service in an HTTP redirect, to evaluate an HTTP request header field of the request to determine whether the second service has set a particular attribute in the HTTP request header field, the HTTP request header field being a request header field designated for the particular attribute, the particular attribute being dedicated to indicating a trust relationship as having been established between the first service and the second service prior to the HTTP request, the particular attribute being distinct from a referer attribute that is indicative of the request having been referred to the first service from the second service;
to perform a validation assessment to determine whether the request is associated with a CSRF attack, the validation assessment being based at least in part on information associated with the particular attribute; and
based on the validation assessment, accepting the request for further processing, or rejecting the request.

12. The computer program product as described in claim 11 wherein the validation assessment includes verifying that the particular attribute is an identifier that can be verified as indicating the trust relationship between the first service and the second service.

13. The computer program product as described in claim 11 wherein the request is accepted when a condition is met, the condition being one of: (i) no referer attributes including the particular attribute are associated with the request; (ii) the particular attribute is present and can be verified as indicating the trust relationship; and (iii) the particular attribute is present together with a referer attribute, and the request can be verified to be associated with a given security token.

14. The computer program product as described in claim 11 wherein the second service is a web portal and the first service is associated with a computing domain that is distinct from the web portal.

* * * * *